US009693232B2

(12) United States Patent
Turker et al.

(10) Patent No.: US 9,693,232 B2
(45) Date of Patent: Jun. 27, 2017

(54) HIGH SECURITY SYSTEM AND METHOD USED IN RADIO SYSTEMS

(71) Applicant: Aselsan Elektronik Sanayi ve Ticaret Anonim Şirketi, Ankara (TR)

(72) Inventors: Neslihan Turker, Ankara (TR); Huseyin Erturk Cetin, Ankara (TR); Ahmet Erol, Ankara (TR); Omer Agah Duran, Ankara (TR); Mehmet Bulbuldere, Ankara (TR); Onur Unver, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 14/770,093

(22) PCT Filed: Feb. 18, 2015

(86) PCT No.: PCT/TR2015/000080
§ 371 (c)(1),
(2) Date: Aug. 25, 2015

(87) PCT Pub. No.: WO2015/126347
PCT Pub. Date: Aug. 27, 2015

(65) Prior Publication Data
US 2016/0360411 A1  Dec. 8, 2016

(30) Foreign Application Priority Data
Feb. 20, 2014 (TR) ................ a 2014 02029

(51) Int. Cl.
*H04L 29/06* (2006.01)
*H04W 12/08* (2009.01)
(Continued)

(52) U.S. Cl.
CPC ........... *H04W 12/08* (2013.01); *H04L 63/123* (2013.01); *H04W 12/06* (2013.01); *H04W 12/12* (2013.01); *H04W 8/02* (2013.01); *H04W 84/08* (2013.01)

(58) Field of Classification Search
None
See application file for complete search history.

(56) References Cited

U.S. PATENT DOCUMENTS

| 6,594,273 | B1 * | 7/2003 | McGibney | ............ | H04W 88/04 |
| | | | | | 370/336 |
| 2003/0232617 | A1 * | 12/2003 | Ishihara | ................ | H04W 8/265 |
| | | | | | 455/411 |

(Continued)

FOREIGN PATENT DOCUMENTS

WO    WO0124560 A1    4/2001

OTHER PUBLICATIONS

"Terrestrial Trunked Radio (TETRA); Voice plus Data (V+D); Part 7; Security", European Standard, European Telecommunications Standards Institute (ETSI), 650, Route Des Lucioles; F-06921 Sophia-Antipolis; France, vol. TETRA 6, No. V3.3.1, Jul. 2012, XP014070176.

*Primary Examiner* — Eric Chen
(74) *Attorney, Agent, or Firm* — Gokalp Bayramoglu

(57) ABSTRACT

The present invention relates to a high security system (1) and method (100) which prevents unauthorized (foreign) radios (R) that are not defined in the system from being served by the main communication system (MCS) in professional radio systems and which thus secures the communication of the radios (R) that are registered in the system.

1 Claim, 2 Drawing Sheets

Figure 1:
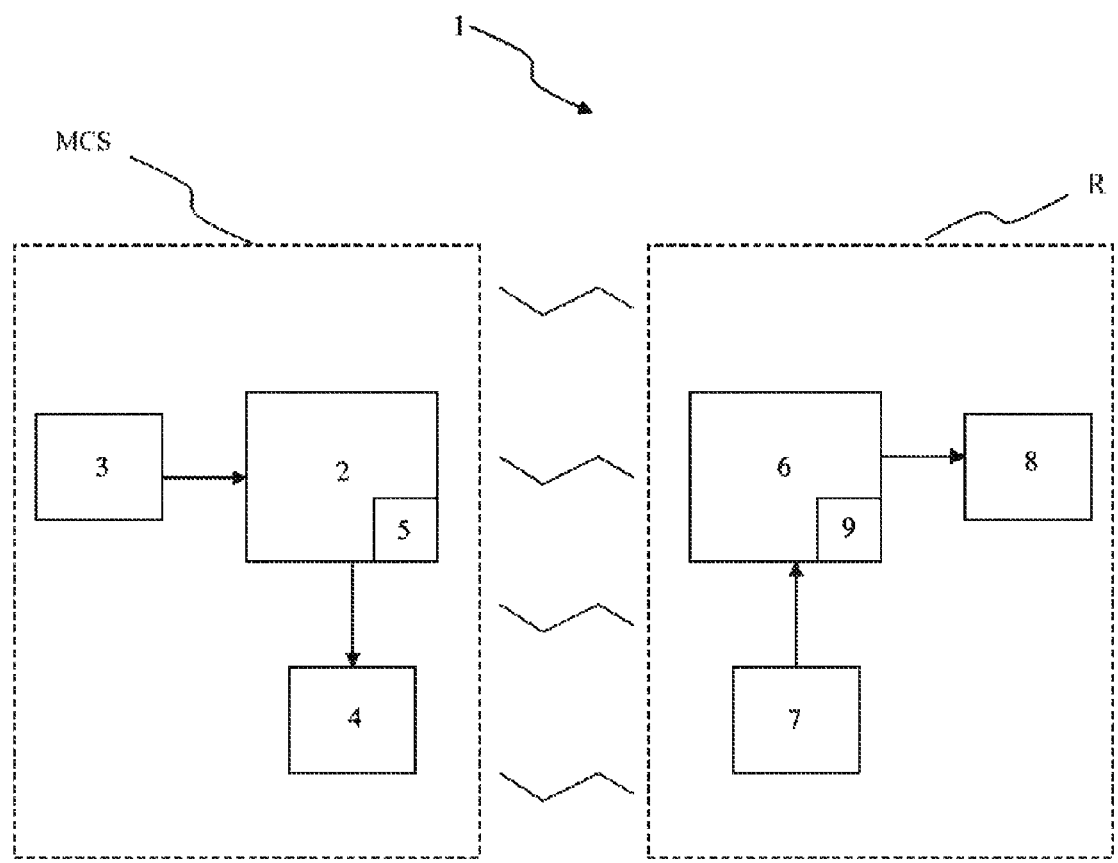

(51) Int. Cl.
    *H04W 12/06*     (2009.01)
    *H04W 12/12*     (2009.01)
    *G06F 7/04*     (2006.01)
    *G06F 15/16*     (2006.01)
    *G06F 17/30*     (2006.01)
    *H04W 84/08*     (2009.01)
    *H04W 8/02*     (2009.01)

(56) References Cited

U.S. PATENT DOCUMENTS

| | | | |
|---|---|---|---|
| 2004/0155792 A1* | 8/2004 | Joyner | G08C 17/02 340/12.51 |
| 2004/0264421 A1* | 12/2004 | Sato | A61K 8/671 370/337 |
| 2009/0042537 A1* | 2/2009 | Gelbman | H04L 12/14 455/406 |
| 2010/0319055 A1* | 12/2010 | Tamura | H04L 63/105 726/4 |
| 2011/0029770 A1 | 2/2011 | Takano | |
| 2011/0314287 A1 | 12/2011 | Escott et al. | |
| 2012/0159588 A1 | 6/2012 | Zhu et al. | |
| 2012/0311335 A1* | 12/2012 | Fransen | H04L 63/06 713/170 |
| 2013/0072155 A1 | 3/2013 | Senese et al. | |
| 2013/0227294 A1 | 8/2013 | Senese et al. | |
| 2013/0243195 A1 | 9/2013 | Kruegel et al. | |
| 2013/0288643 A1* | 10/2013 | Panpaliya | H04L 1/0061 455/411 |

\* cited by examiner

HIGH SECURITY SYSTEM AND METHOD USED IN RADIO SYSTEMS

FIELD OF THE INVENTION

The present invention relates to a high security system and method which prevents unauthorized (foreign) radios that are not defined in the system from being served by the system in professional radio systems and which thus secures the communication of the radios that are registered in the system.

BACKGROUND OF THE INVENTION

In the state of the art applications, registration of unauthorized radios to the system is prevented by means of authentication methods. With this method, resource allocation is not made for the requests made by a radio that is not registered in the system.

In the state of the art applications, in a conventional system, the voice packets transmitted by a valid and authenticated radio in uplink can be listened to and the related parameters (LC, ES) in this valid packet can be obtained. These parameters can be programmed to a radio that is not registered in the system. When the foreign radio is enabled to start transmitting voice in the system frequency, the foreign radio both occupies the system and can engage in unauthorized communication via the system.

The International patent application document no. WO0124560, an application in the state of the art, discloses an encryption technique applied in the communication of the mobile device with the base station. This encryption process is performed by an encryption key and it is stated that the parameters compared in the encryption process are changed periodically.

The United States Patent document no. US2011314287, an application known in the state of the art, discloses a method which enables authentication between devices. It is disclosed that in this method, authentication is performed by matching the information of the device defined as the subscriber with the network information.

The United States Patent document no. US20120159588, an application known in the state of the art, discloses an authentication system which can also be applied in radio systems and allows access to a plurality of services through a single device. It is also disclosed that this system is periodically updated.

The United States Patent document no. US2011029770, an application known in the state of the art, discloses a radio communication system which enables to select the suitable process for authentication for the same user.

SUMMARY OF THE INVENTION

The objective of the present invention is to provide a high security system and method which, in professional radio systems, prevents unauthorized radios that are not defined in the system from being served by the system and which thus secures the communication of the radios that are registered in the system.

DETAILED DESCRIPTION OF THE INVENTION

Figure 2:
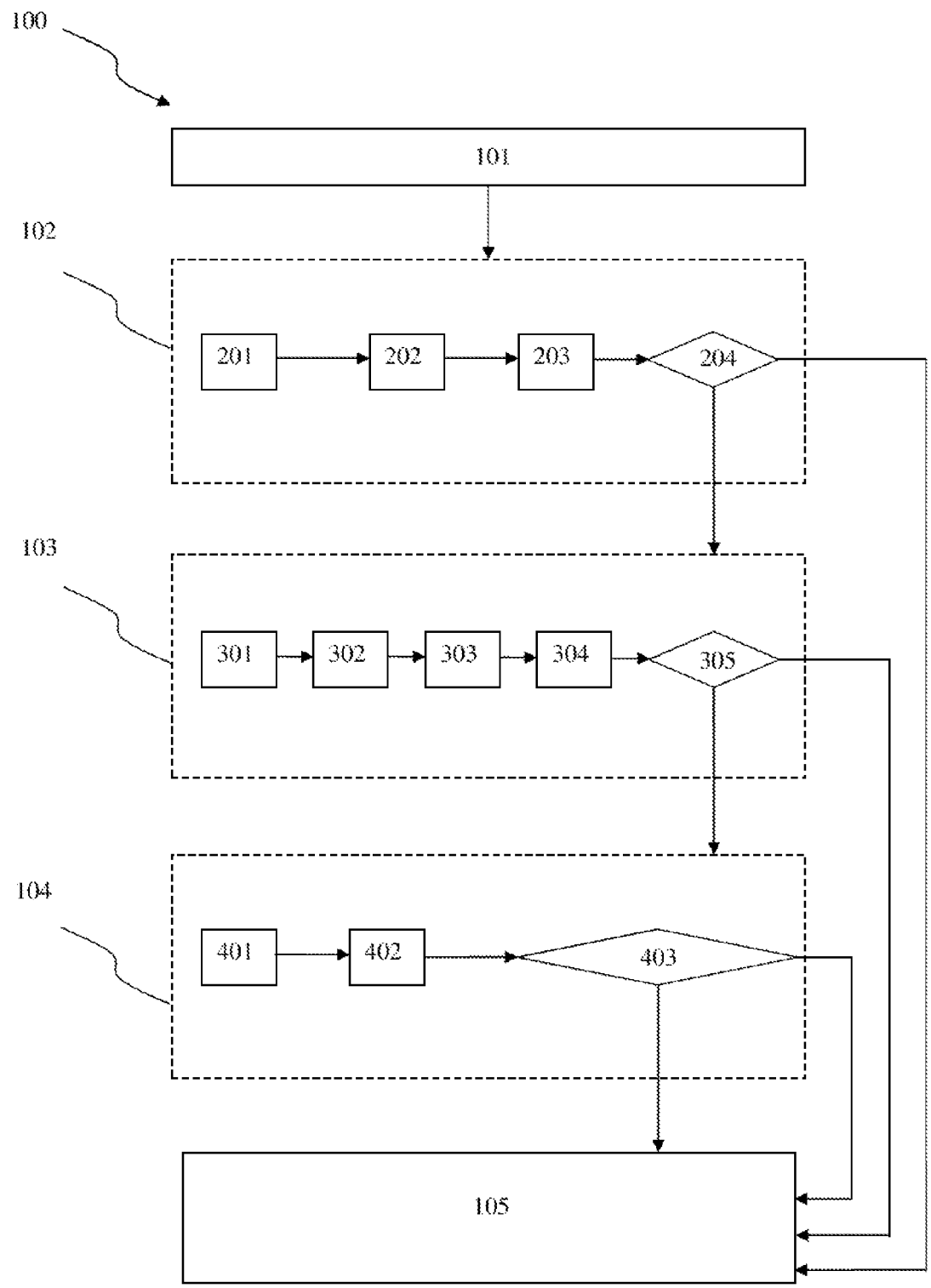

A high security system and method developed to fulfill the objective of the present invention are illustrated in the accompanying figures, in which;

FIG. 1 is a schematic view of the high security system.
FIG. 2 is a schematic view of the high security method.

The components in the figures are given reference numbers as follows:
1. High security system
2. Main control unit
3. Main receiver unit
4. Main transmitter unit
5. Main memory unit
6. Radio control unit
7. Radio receiver unit
8. Radio transmitter unit
9. Radio memory unit
MCS. Main communication system
R. Radio The high security system (IT) which, in professional radio systems, prevents unauthorized radios that are not defined in the system from being served by the main communication system (MCS), and which thus secures the communication of the radios (R) that are registered in the system, basically comprises at least main control unit (2) which is adapted to perform main controls and generate the parameters, at least one main receiver unit (3) which is adapted to receive the signals coming from an interface and transmit them to the main control unit (2), at least one main transmitter unit (4) which is adapted to send out the signals coming from the main control unit (2) to air interface, at least one main memory unit (5) which is adapted to store the data and is preferably located on the main control unit (2), at least one radio control unit (6) which is adapted to perform parameter controls and to save the parameters when necessary, at least one radio receiver unit (7) which is adapted to receive the signals coming from air interface and transmit them to the radio control unit (6), at least one radio transmitter unit (8) which is adapted to send out the signals coming from the radio control unit (6) to air interface, at least one radio memory unit (9) which is adapted to store the data and parameters and is preferably located on the radio control unit (6).

In one embodiment of the invention, the high security system (1) includes thereon a main control unit (2) which is adapted to perform main controls and generate the parameters, a main receiver unit (3) which is adapted to receive the signals coming from air interface and transmit them to the main control unit (2), a main transmitter unit (4) which is adapted to send out the signals coming from the main control unit (2), and a main memory unit (5) which is adapted to store the data. The high security system (1) also includes a radio control unit (6) which is adapted to perform parameter controls and to save the parameters when necessary, a radio receiver unit (7) which is adapted to receive the signals coming from air interface and transmit them to the radio control unit (6), a radio transmitter unit (8) which is adapted to send out the signals coming from the radio control unit (6), and a radio memory unit (9) which is adapted to store the data and parameters.

In a preferred embodiment of the invention, the main memory unit (5) provided on the high security system (1) of the present invention can he used externally. Furthermore, the main memory unit (5) and the main control unit (2) can be used separately (not embedded), and the connection between the main memory unit (5) and the main control unit (2) can be provided by wired/wireless means.

In a preferred embodiment of the invention, the radio memory unit (9) provided on the high security system (1) of the present invention can be used externally. Furthermore, the radio memory unit (9) and the radio control unit (6) can be used separately (not embedded) and the connection between the radio memory unit (9) and the radio control unit (6) can be provided by wired/wireless means.

In a preferred embodiment of the invention, the high security system (1) of the present invention is used in APCO P25 professional radio systems.

The high security method (100), which, in professional radio systems, prevents unauthorized radios that are not defined in the system from being served by the main communication system (MCS) and which thus secures the communication of the radios (R) that are registered in the system, basically comprises the steps of
- the main control unit (2) starting the high security system (1) (101),
- controlling the ALGID values in the uplink voice packet (102),
- controlling the Authentication Response (RES1) values in LSD (Low Speed Data) included in the uplink voice packet (103),
- controlling the Source ID in the downlink voice packet (104),
- terminating the high security system (1) (105).

The step of "controlling the ALGID values in the uplink voice packet (102)" of the high security method (100) comprises the sub-steps of
- the radio transmitter unit (8) transmitting the ALGID values in the radio memory unit (9) by means of the radio control unit (6) (201),
- the main receiver unit (3) receiving the ALGID values and sending them to the main control unit (2) (202),
- comparing the ALGID values with the values in the main memory unit (5) (203),
- if there is a discrepancy between the ALGID values and the values in the main memory unit (5), the main control unit (2) stopping broadcasting the voice packets; if the values match, passing to step 103 (204).

The step of "controlling the Authentication Response (RES1) values in LSD (Low Speed Data) included in the uplink voice packet (103)" of the high security method (100) comprises the sub-steps of
- transmitting the RES 1 (response) value, which is recorded in the radio memory unit (9) and is used by the radio (R) for authentication, to the radio control unit (6) (301),
- entering the RES1 value coming from the radio control unit (6) into the LSD (Low Speed Data) field in the uplink voice packet, and the radio transmitter unit (8) sending the voice packet (302),
- the main receiver unit (3) receiving the voice packet and sending it to the main control unit (2) (303),
- comparing the RES1 value in the LSD field within the uplink voice packet with the values in the main memory unit (5) (304),
- if there is a discrepancy between the RES1 value and the values in the main memory unit (5), the main control unit (2) stopping broadcasting the voice packets, renewing registration and authentication of the concerned radio (R) by sending registration command (U_REG_CMD) to the radio and updating RES1 value; if the values match, passing to step 104 (305).

The step of "controlling the Source ID in the downlink voice packet (104)" of the high security method (100) comprises the sub-steps of
- the radio receiver unit (7) receiving the downlink voice packet and transmitting it to the radio control unit (6) (401),
- the radio control unit (6) carrying out the control of the Source ID in the downlink voice packet (402),
- if, as a result of the control, the radio (R) sees its own ID as the Source ID, upon figuring out that a foreign radio has copied its parameters and is sending voice packets with these parameters, the radio (R) renewing registration and authentication and updating RES1 value; if the radio (R) does not see its ID as the Source ID, going to step 105 (403).

The invention claimed is:

1. A high security method for preventing unauthorized radio devices that are not defined in the system from being served by main communication system, and for securing communication of radio devices that are registered in the system, the method comprising the steps of:
main control unit starting the high security system controlling Algorithm Identification (ALGID) values in an uplink voice packet, wherein the step of controlling the ALGID values comprises:
radio transmitter unit transmitting the ALGID values in a radio memory unit by means of a radio control unit;
main receiver unit receiving the ALGID values and sending the ALGID values to the main control unit;
comparing the ALGID values with values in the main memory unit;
when there is a discrepancy between the ALGID values and the values in the main memory unit, the main control unit stopping broadcasting the uplink voice packets;
when the ALGID values match, controlling authentication response (RES1) values in Low Speed Data (LSD) included in the uplink voice packet, wherein the step of controlling the RES1 in LSD comprises:
transmitting the RES1 value, which is recorded in the radio memory unit and used by the radio device for authentication, to the radio control unit;
entering the RES1 value coming from the radio control unit into the LSD field in the uplink voice packet, and the radio transmitter unit sending the uplink voice packet;
the main receiver unit receiving the uplink voice packet and sending it to the main control unit;
comparing the RES1 value in the LSD field within the uplink voice packet with the values in the main memory unit;
when the RES1 value matches the values in the main memory unit, controlling the source ID in downlink voice packet;
when there is a discrepancy between the RES1 value and the values in the main memory unit, the main control unit stopping broadcasting the voice packets, renewing registration and authentication of the radio device by sending registration command (U_REG_CMD) to the radio device and updating RES1 value;
when the updated RES1 value does not match with the values in the main memory unit, terminating the high security system;
when the updated RES1 value and the values in the main memory unit match, controlling the source ID in downlink voice packet, wherein controlling the source ID in the downlink voice packet comprises:

the radio receiver unit receiving the downlink voice packet and transmitting the downlink voice packet to the radio control unit;

the radio control unit carrying out the control of the source ID in the downlink voice packet;

when the radio device sees its own ID as the source ID, determining that a foreign radio has copied its parameters and is sending voice packets with the parameters, the radio device renewing registration and authentication and updating RES1 value; and when the radio device does not see its ID as the source ID, terminating the high security system.

* * * * *